US011511380B2

(12) United States Patent
Chang et al.

(10) Patent No.: US 11,511,380 B2
(45) Date of Patent: Nov. 29, 2022

(54) METHOD FOR CAPTURING TOOL PATH AND DEVICE THEREOF

(71) Applicant: Industrial Technology Research Institute, Hsin-Chu (TW)

(72) Inventors: Yu-Ling Chang, Taichung (TW); Chih-Yuan Hsu, Kaohsiung (TW); Guo-Wei Wang, Tainan (TW); Yu-An Tseng, Taichung (TW); Yung-Sheng Chang, Taichung (TW); Bei-Hua Yang, Pingtung County (TW); Chia-Chun Li, Taichung (TW); Shuo-Peng Liang, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 538 days.

(21) Appl. No.: 16/727,008

(22) Filed: Dec. 26, 2019

(65) Prior Publication Data
US 2021/0170538 A1 Jun. 10, 2021

(30) Foreign Application Priority Data
Dec. 10, 2019 (TW) ................................ 108145027

(51) Int. Cl.
*B23Q 15/013* (2006.01)
*B23Q 15/08* (2006.01)
(Continued)

(52) U.S. Cl.
CPC ........... *B23Q 15/013* (2013.01); *B23Q 15/08* (2013.01); *G05B 19/182* (2013.01); *G05B 19/25* (2013.01); *G05B 19/4163* (2013.01); *G06F 30/20* (2020.01)

(58) Field of Classification Search
None
See application file for complete search history.

(56) References Cited

U.S. PATENT DOCUMENTS

| 6,671,571 B1 | 12/2003 | Matsumiya et al. |
| 2012/0197421 A1* | 8/2012 | Kimura ............ G05B 19/40932 700/97 |

(Continued)

FOREIGN PATENT DOCUMENTS

| CN | 102707671 | 10/2012 |
| TW | 356434 | 4/1999 |

(Continued)

OTHER PUBLICATIONS

Lin, Chien-De, "CNC machine tool fast circular interpolation algorithm", Jul. 1993, p. 105-117, No. 9, Journal of Kao Yuan University.

(Continued)

*Primary Examiner* — Ryan A Jarrett
(74) *Attorney, Agent, or Firm* — WPAT, PC

(57) ABSTRACT

A method for capturing a tool path, applicable to a machine tool having a controller and furnished with a tooling, includes the steps of: obtaining a data update frequency of the controller; calculating a feed rate of the controller, determining whether or not the feed rate is obtained, going to next step if positive, and going to the previous step if negative; reading G-codes of the controller to confirm the feed rate; and, based on the confirmed feed rate, recording machine coordinates transmitted from the controller for synthesizing a tool path file. The tool path file is used for simulation and analysis of machining of the machine tool. In addition, a device for capturing the tool path is also provided.

7 Claims, 4 Drawing Sheets

(51) Int. Cl.
*G05B 19/416* (2006.01)
*G05B 19/25* (2006.01)
*G06F 30/20* (2020.01)
*G05B 19/18* (2006.01)

(56) References Cited

U.S. PATENT DOCUMENTS

| | | | |
|---|---|---|---|
| 2013/0253694 A1 | 9/2013 | Chung et al. | |
| 2015/0127139 A1 | 5/2015 | Bolin et al. | |
| 2018/0150060 A1* | 5/2018 | Hsu | G05B 19/40937 |

FOREIGN PATENT DOCUMENTS

| | | |
|---|---|---|
| TW | I405092 | 8/2013 |
| TW | I454868 | 10/2014 |
| TW | I554856 | 10/2016 |
| TW | M540990 | 5/2017 |
| TW | I607825 | 12/2017 |
| TW | I645933 | 1/2019 |
| TW | 201923495 A | 6/2019 |
| WO | 2013/046785 A1 | 4/2013 |
| WO | WO2019/188619 A1 | 10/2019 |

OTHER PUBLICATIONS

Hsi-Yung Feng et al., "Integrated tool path and feed rate optimization for the finishing machining of 3D plane surfaces", accepted Mar. 17, 2000, pp. 1557-1572, International Journal of Machine Tools & Manufacture 40 (2000).

C.H. Lauro et al., "Monitoring and processing signal applied in machining processes—A review", pp. 73-86, Accepted Aug. 14, 2014, Available online Aug. 27, 2014, Elsevier Ltd.

Julio Garrido Campos et al., "Standard process monitoring and traceability programming in collaborative CAD/CAM/CNC manufacturing scenarios", Accepted Sep. 27, 2010, Available online Nov. 26, 2010, Computers in Industry.

Y. Altintas et al., "Virtual process systems for part machining operations", 2014, pp. 585-605, CIRP.

TW OA dated Aug. 31, 2020.

* cited by examiner

METHOD FOR CAPTURING TOOL PATH AND DEVICE THEREOF

CROSS REFERENCE TO RELATED APPLICATION

This application claims the benefits of Taiwan application Serial No. 108145027, filed on Dec. 10, 2019, the disclosures of which are incorporated by references herein in its entirety.

TECHNICAL FIELD

The present disclosure relates in general to a method and device for capturing a tool path, and more particularly to the method and device for capturing a tool path that can adjust a feed rate of a cutting tool according to a communication frequency of a controller of the machine tool.

BACKGROUND

Currently, prior to performance analysis upon machine tools, complete information of tool paths needs to be collected in advance. However, since a typical controller of the conventional machine tool usually adopts a communication protocol unable to provide real-time data transmission, from which substantial time delay would be inevitable to result in incomplete or disconnected collection of coordinates, thus significant bias in reconstructing the cutting path would be expected.

In addition, if a machining program is provided by a computer aided design (CAD) system through a computer aided manufacturing (CAM) simulation, path planning shall be performed in advance to generate an intermediate file for obtaining corresponding G-codes (one of program languages for numerical controls), and thus practical machining of the machine tool can't be present in a real-time manner. However, if an interpreter is introduced to realize the G-codes, following maintenance or service difficulty would be encountered due to singularity and incompleteness of the interpreter.

In addition, the current CAM system may not produce G-codes for supporting the tool path file generally in an advanced packaging tool (APT) format. Since the tool path file is a long-streaming cluster of machine coordinates, thus, while in analyzing the tool-path information, each of the coordinates in the tool path shall be analyzed, the corresponding G-codes shall be processed also to form a tool path file, and additional macro instructions shall be prepared as well. Obviously, after all these tedious processes, it can be foreseen that inaccuracy would arise.

In other words, currently while in performing the tool-path analysis, either by the controller or by software, bias and difficulty in obtaining the tool-path data would be inevitable.

Accordingly, a method and device for capturing useful tool-path information that can adjust a feed rate of the cutting tool according to a communication frequency of the controller of the machine tool would be welcome and also urgent needs to the skill persons in the art.

SUMMARY

In one embodiment of this disclosure, a method for capturing a tool path includes the steps of:
(a) obtaining a data update frequency of a controller of a machine tool;
(b) determining whether or not a suitable feed rate is needed;
(c) if positive, reading G-codes of the controller to confirm the feed rate;
(d) based on the feed rate, recording machine coordinates to synthesize a tool path file.

In another embodiment of this disclosure, a device for capturing a tool path includes:
a communication-frequency analysis unit, used for obtaining a data update frequency of a controller of a machine tool and further for determining whether or not a suitable feed rate is needed;
a cutting-speed control unit, based on a feed rate and G-codes of the controller to confirm the feed rate; and
a tool-path capture unit, based on the confirmed feed rate to receive machine coordinates transmitted from the controller so as further to synthesize a tool path file.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
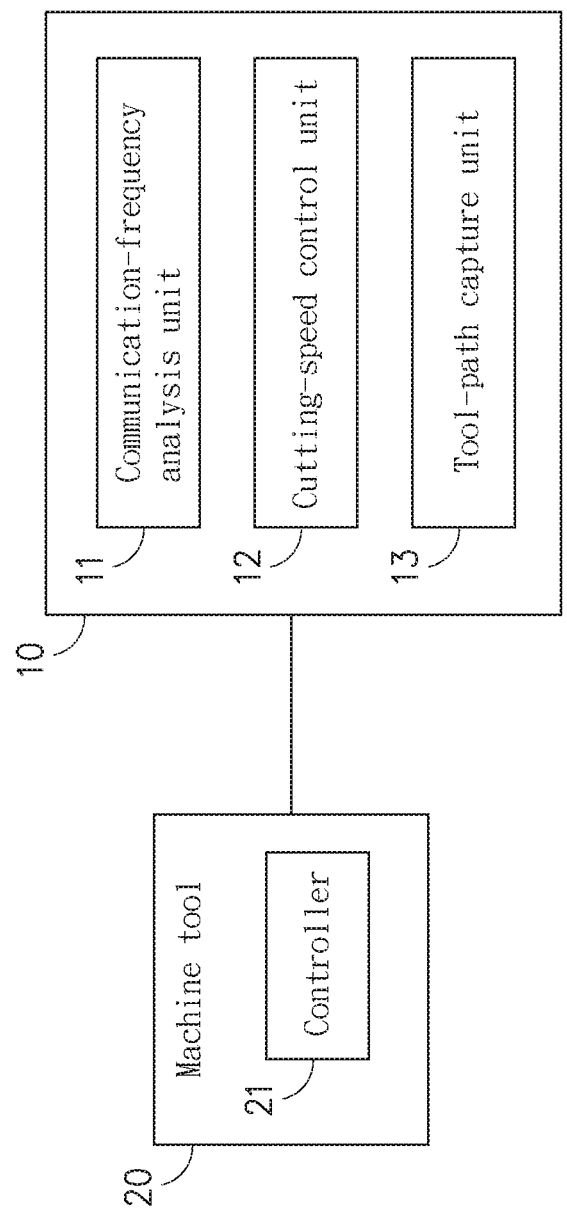
FIG. 1 is a schematic block view of an embodiment of the device for capturing a tool path in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, a schematic block view of an embodiment of the device for capturing a tool path in accordance with this disclosure is shown. The device 10 for capturing a tool path includes a communication-frequency analysis unit 11, a cutting-speed control unit 12 and a tool-path capture unit 13, and all of which are coupled electrically together. The device 13 for capturing a tool path and a controller 21 of a machine tool 20 are generally connected in a cable manner for bi-directional data transmission. In this disclosure, the device 10 for capturing a tool path 10 can be embodied through computers.

The machine tool 20 can be a computer numerical control (CNC) machine tool, and the controller 21 can be a CNC controller thereto. The controller 21 is used for transmitting relative machining parameters of the machine tool 20 (for example, coordinates of a cutting path) to the device 10 in a periodical manner. In one exemplary example, the controller 21 can transmit or update a set of data for every 5 ms. Namely, a data update frequency of the controller 21 is one per 5 ms. However, according to this disclosure, this frequency is not fixed, but can be varied per practical requirements. Thus, the device 10 shall determine a suitable update frequency for the controller 21 in advance, such that the capturing or sampling accuracy in reconstructing machine coordinates can be upheld. For instance, if the update frequency is set too high, then the tool-path reconstruction precision would be high as well, but the associated calculations would be huge and definitely time-consuming.

Figure 2:
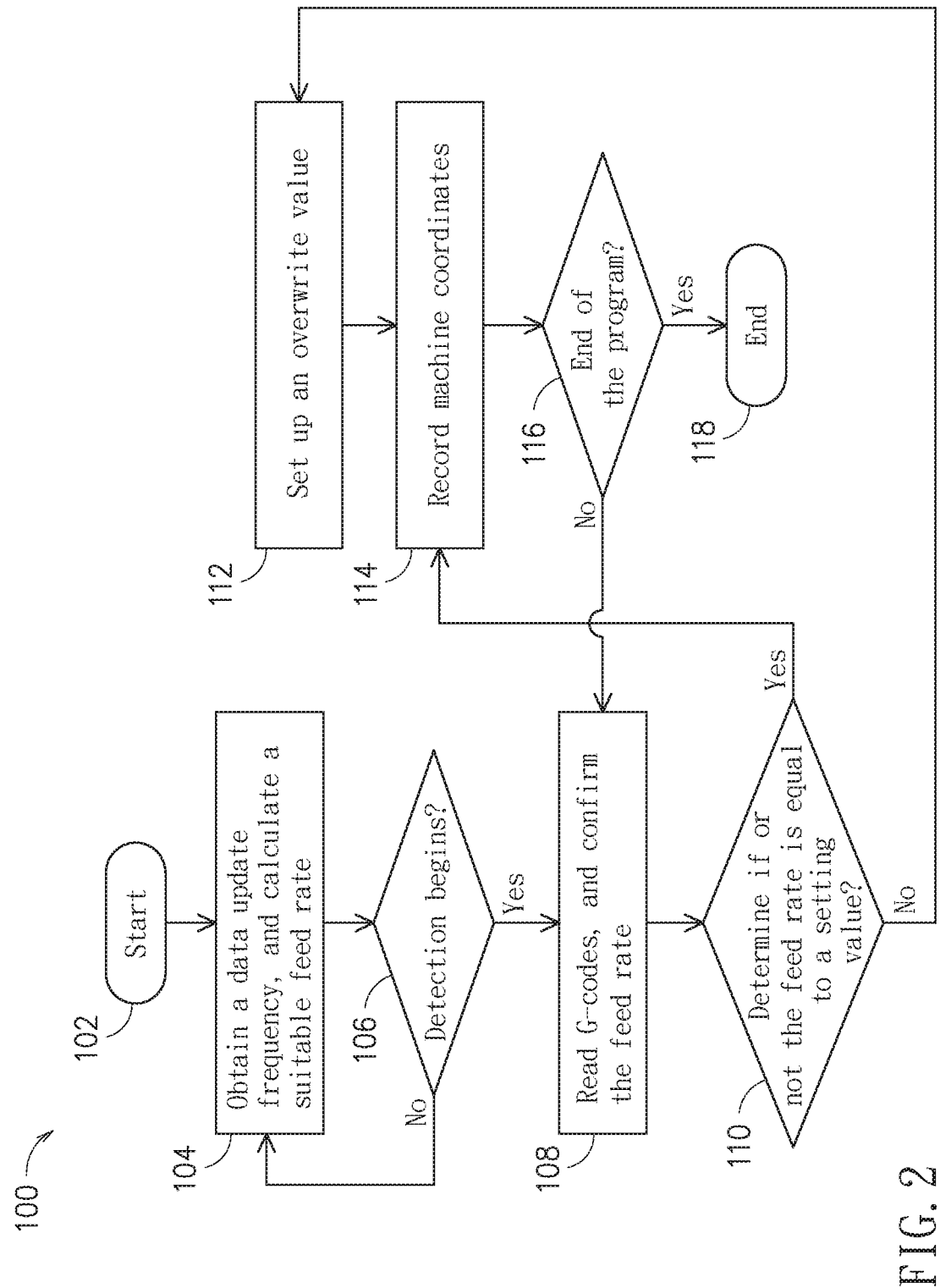
FIG. 2 is a schematic flowchart of an embodiment of the method for capturing a tool path in accordance with this disclosure.

Referring to both FIG. 1 and FIG. 2, the method 100 for capturing a tool path includes the following steps.

Step 102: Start the method.

Step 104: Obtain the data update frequency for the controller 21 of the machine tool 20, and calculate a cutting speed or a feed rate for the tooling. The device 10 evaluates the update frequency to receive continuous machine coordinates transmitted from the controller 21. Within a running period of the test program, the machine coordinates are used for calculating the feed rate (mm/sec) of the tooling. In this embodiment, the communication-frequency analysis unit 11 of FIG. 1 is applied to perform Step 104, Step 106: Detection continues till all the suitable feed rates are obtained for all individual paths. If negative, then go back to perform Step 104 for obtaining all the suitable feed rates. In this disclosure, Step 106 can be integrated with Step 104 as a single step.

Step 108: Read the G-codes from the test program of the controller, and confirm the feed rates. In this step, based on the G-codes of the test program to confirm the suitable feed rate for each path. In this disclosure, the G-codes for the machining program includes linear cutting instructions and curve cutting instructions. For example, the feed rate of a linear path may be greater than that of a curve path, so that the capturing time can be substantially saved. Herein, the machining program is different to the aforesaid test program of Step 104. In this embodiment, the cutting-speed control unit 12 of FIG. 1 is applied to perform Step 108.

Step 110: Determine whether or not the feed rate is equal to the setting value. If negative, then go to perform Step 112. If positive, go to perform Step 114. In this embodiment, the setting value is simply determined according to practical requirements so as for providing a reference basis, and thus is not fixed. In another embodiment not shown herein, Step 110 is omitted.

Step 112: Set an overwrite value for possible feed override and for adjusting the feed rate. While it is determined that, in Step S108, the feed rate is not equal to the setting value (i.e., either greater or smaller), then the overwrite value is set moderately to be higher or lower than the feed rate, so that the suitable feed rate can be obtained. In this embodiment, the overwrite value is a percentage. In another embodiment not shown herein, Step 112 can be omitted.

Step 114: Record the machine coordinates. According to the last, i.e., the final of the confirmed feed rate, the controller is amended to receive a plurality of continuous machine coordinates by the update frequency, and the plurality of continuous machine coordinates is collected into a cluster of machine coordinates for synthesizing a tool path file. In this embodiment, the tool-path capture unit 13 of FIG. 1 is applied to perform Step 114.

Step 116: Determine whether or not an end of the machining program is met. If positive, then the method would be ended (i.e., go to Step 118). If negative, then go back to Step 108.

Step 118: End of the method.

Figure 3:
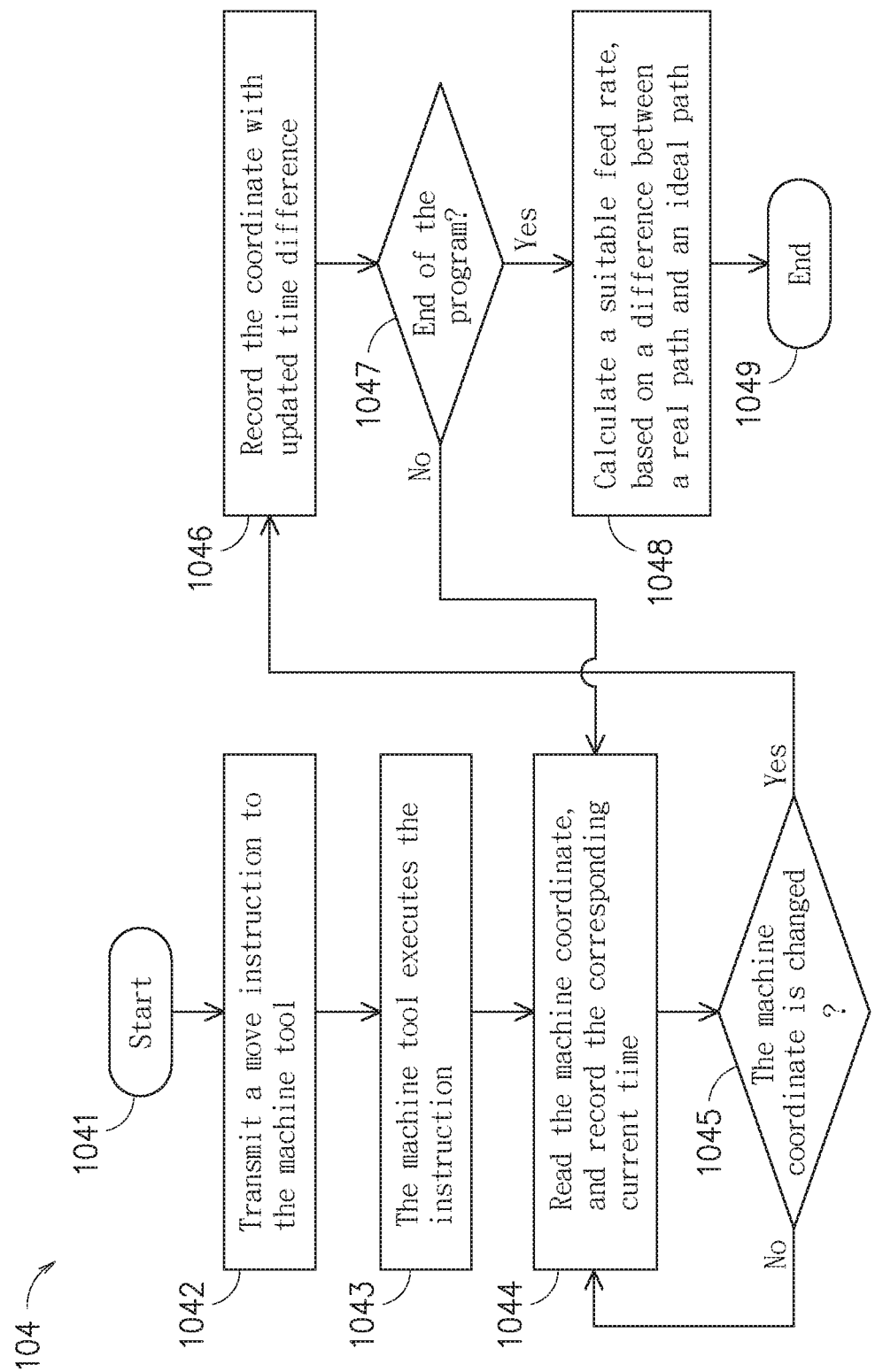
FIG. 3 is a schematic flow chart of an exemplary example of Step 104 of FIG. 2.

Referring now to both FIG. 1 and FIG. 3, detail steps for Step 104 of FIG. 2 for calculating the tooling feed rate can include the steps as follows.

Step 1041: Start.

Step 1042: Transmit a move instruction to the machine tool 20. The test program is transmitted to the controller 21, and thus the controller 21 can order the machine tool 20 to perform a linear or curve movement so as to produce continuously machine coordinates. The test program for the machine tool 20 to simulate machining may include a plurality of move instructions.

Step 1043: The machine tool 20 performs the move instruction.

Step 1044: Read the machine coordinates, and record the corresponding instant time. In other word, different coordinates on the tooling path are read, and assigned with individual tike labels for comparisons in the following steps.

Step 1045: Determine whether or not the machine coordinates are varied. If positive, then perform Step 1046. If negative, go back to perform Step 1044 to keep reading and recording. In this embodiment, a change in specific coordinates implies that the tooling path meets a change; for example, from a linear path to a curve path, from a curve path to a linear path, or when the tooling path is deviated.

Step 1046: Record the coordinate with updated time difference. Upon when the machine coordinates are determined to be varied in Step 1045, the new (i.e., the different) machine coordinates are assigned with corresponding time labels for comparison in the following steps.

Step 1047: Determine whether or not the test program meets an end. If positive, go to Step 1048. If negative, then go back to Step 1044.

Step 1048: Based on the difference between the real path and the ideal path, the suitable feed rate can be calculated. While the test program is determined to meet the end in Step 1047, the suitable feed rate can be calculated by analyzing tooling feed rates fat different time labels.

Step 1049: End.

As the aforesaid steps are completed, then the suitable feed rate can be obtained, and Step 106 of FIG. 2 is then performed.

Figure 4:
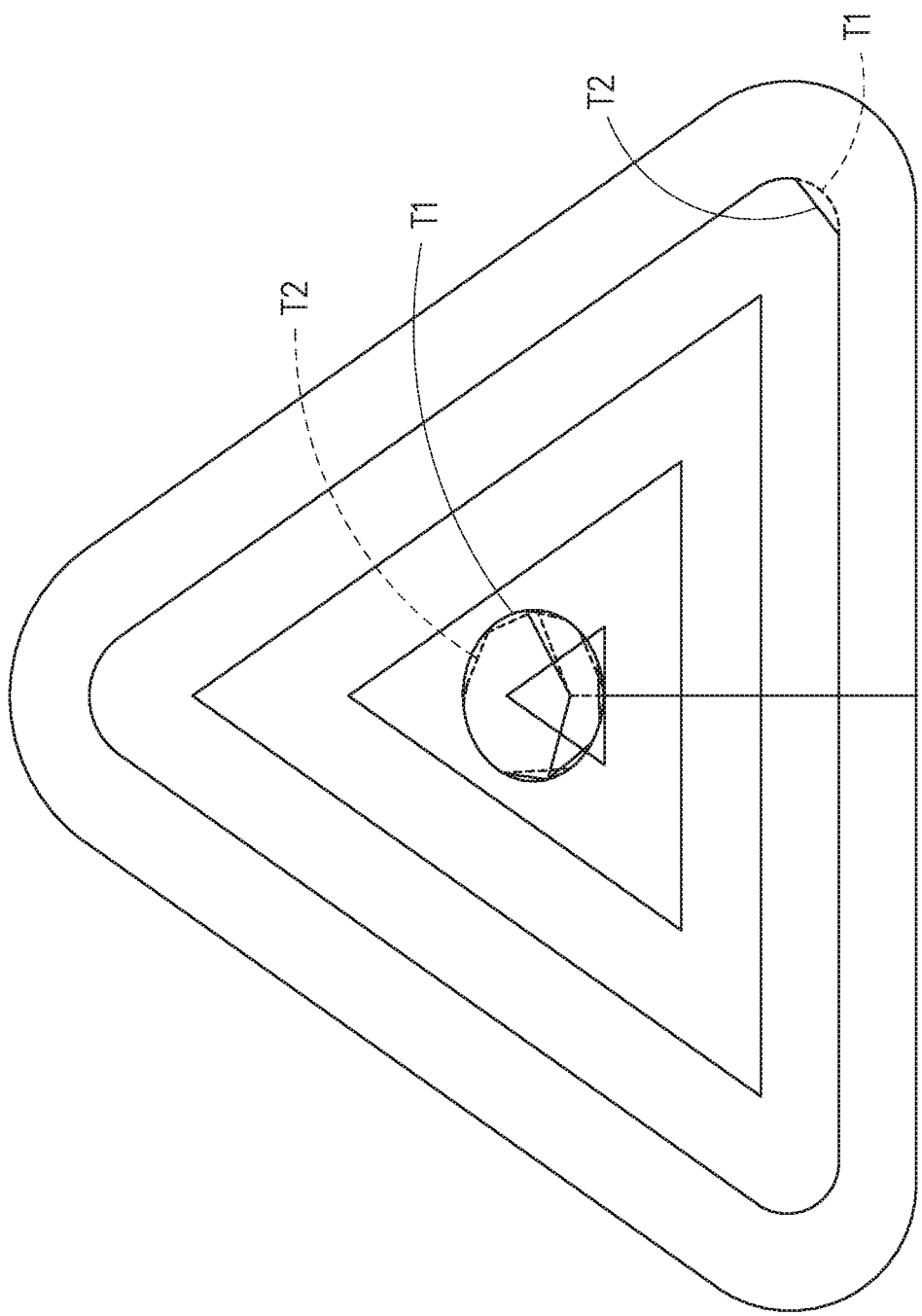
FIG. 4 demonstrates schematically a comparison between a conventional tool path and a new tool path provided by the method of this disclosure.

Referring now to FIG. 4, a comparison between a conventional tool path and a new tool path provided by the method of this disclosure is schematically shown. In FIG. 4, the solid lines indicate the conventional tool paths T1, and the dashed lines indicate the new paths T2 provided by the method for capturing a tool path according to the present disclosure. Mostly, the conventional tool paths T1 and the corresponding new paths T2 are overlapped, except for some locations. As shown, obvious differences exist particularly at the corners. It implies that the curve path may need a smaller feed rate and a higher data update frequency.

As shown in FIG. 4, a corner difference of the tool path T1 at the central area is about 1.130407 mm, and a round difference thereof at the right lower area is about 0.387674 mm, with an execution time of 41 seconds. After the method for capturing a tool path provided by this disclosure is introduced to perform corrections, the corner difference of the new path T2 at the same central area is about 1.13045 mm, and the round difference thereof at the same right lower area is about 0.079694 mm, with an execution time of 39 seconds. It is obvious that the new paths T2 provided by the method for capturing a tool path of this disclosure can be much more accurate, with a shorter sampling time (i.e., a higher data update frequency). One of the reasons why the present method can be better over the prior art is that, while in machining according to the new path T2, the feed rate of the cutting tool in the linear portion can be larger (i.e., to accelerate), and that in a corner or a curve portion can be smaller (i.e., to decelerate). Thereupon, more accurate tool path can be obtained, and the sampling time can be substantially shortened.

In summary, the method and device for capturing a tool path provided by this disclosure can evaluate the communication frequency of the controller of the machine tool can calculate a more suitable feed rate. In this disclosure, even that, in this disclosure, calculations of the feed rate are not limited to any specific algorithm and any brand of the controller or interpreter, and also no macro instruction is required; yet the cutting speed of the machine tool can be controlled more accurately, the execution time can be shorter, and the precision of the tool path can be ensured.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for capturing a tool path, applicable to a machine tool having a controller and furnished with a tooling, comprising the steps of:
   (a) obtaining a data update frequency of the controller;
   (b) calculating a feed rate of the controller, determining whether or not the feed rate is obtained, going to step (c) if positive, and going to the step (a) if negative;
   (c) reading G-codes of the controller to confirm the feed rate; and
   (d) based on the confirmed feed rate, recording machine coordinates transmitted from the controller for synthesizing a tool path file.

2. The method for capturing a tool path of claim 1, further including the following steps between the step (c) and the step (d):
   (c1) determining whether or not the feed rate is equal to a setting value, going to step (c2) if negative, and going to the step (d) if positive; and
   (c2) setting an overwrite value to adjust the confirmed feed rate.

3. The method for capturing a tool path of claim 2, wherein the overwrite value is a percentage.

4. The method for capturing a tool path of claim 1, wherein the step (b) includes the steps of:
   (b1) transmitting a move instruction to the machine tool;
   (b2) the machine tool performing the move instruction;
   (b3) reading the machine coordinates, and recording corresponding current times;
   (b4) determining whether or not the machine coordinates are varied, going to step (b5) if positive, and going back to step (b3) if negative;
   (b5) updating the machine coordinates and the current times;
   (b6) determining whether or not the move instruction is already performed, going to step (b7) if positive, and going back to the step (b3) if negative; and
   (b7) based on a difference between a real path and an ideal path, calculating the feed rate.

5. The method for capturing a tool path of claim 4, wherein, in the step (b1), a test program is transmitted to the controller, and the test program includes the move instruction.

6. The method for capturing a tool path of claim 1, wherein the feed rate includes a linear-path feed rate and a curve-path feed rate.

7. A device for capturing a tool path, coupled electrically with a controller of a machine tool, comprising:
   a communication-frequency analysis unit, used for obtaining a data update frequency of the controller, and for calculating a suitable feed rate of the controller;
   a cutting-speed control unit, used for evaluating a feed rate and G-codes of the controller to confirm the feed rate; and
   a tool-path capture unit, used for evaluating the confirmed feed rate to receive machine coordinates transmitted from the controller for synthesizing a tool path file.

* * * * *